United States Patent
Huang et al.

(10) Patent No.: US 10,091,822 B2
(45) Date of Patent: Oct. 2, 2018

(54) ALLOCATION OF UPLINK RESOURCES IN ORTHOGONAL FREQUENCY-DIVISION MULTIPLE ACCESS (OFDMA) WIRELESS NETWORKS

(71) Applicant: MEDIATEK INC., Hsinchu (TW)

(72) Inventors: Rongsheng Huang, Fremont, CA (US); Tianyu Wu, Fremont, CA (US); Jianhan Liu, San Jose, CA (US); Chao-Chun Wang, Taipei (TW); Chih-Shi Yee, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 148 days.

(21) Appl. No.: 14/977,632

(22) Filed: Dec. 21, 2015

(65) Prior Publication Data

US 2016/0183305 A1    Jun. 23, 2016

Related U.S. Application Data

(60) Provisional application No. 62/095,886, filed on Dec. 23, 2014.

(51) Int. Cl.
  *H04W 74/08* (2009.01)
  *H04W 72/02* (2009.01)
  *H04W 74/02* (2009.01)

(52) U.S. Cl.
  CPC ....... *H04W 74/0833* (2013.01); *H04W 74/02* (2013.01)

(58) Field of Classification Search
  None
  See application file for complete search history.

(56) References Cited

U.S. PATENT DOCUMENTS

| 80,267,126 | 10/2008 | Vujcic et al. | 370/330 |
| 30,070,627 | 3/2013 | Chen et al. | 370/252 |

(Continued)

FOREIGN PATENT DOCUMENTS

WO    WO2007022787 A1    8/2005

OTHER PUBLICATIONS

EPO, Search Report for the EP patent application 15202452.7 dated Aug. 23, 2016 (13 pages).

(Continued)

*Primary Examiner* — Charles C Jiang
*Assistant Examiner* — Saad Khawar
(74) *Attorney, Agent, or Firm* — Imperium Patent Works; Mark Marrello

(57) ABSTRACT

A method of improved allocation of uplink resources in an OFDMA network is proposed. A wireless communications station (an AP) reserves both dedicated resource and contention resource for uplink OFDMA operation for a list of communications devices (STAs). The AP can switch between random access operation and non-random access operation without the need for any special protection mechanisms. In the event of an increase in uplink OFDMA frame collisions the AP can switch from random operation to non-random operation to reduce the number of collisions. In the event of a decrease in uplink OFDMA frame collisions the AP can switch from non-random operation to random operation to reduce required AP processing. The AP can also dynamically control a STA access probability to reduce the number of collisions by reducing the number of uplink OFDMA frames each STA transmits.

18 Claims, 8 Drawing Sheets

(56) References Cited

U.S. PATENT DOCUMENTS

| | | | |
|---|---|---|---|
| 2005/0157678 A1 | 7/2005 | Mantha et al. | 370/329 |
| 2008/0318607 A1 | 12/2008 | Torsner et al. | 455/509 |
| 2012/0201219 A1* | 8/2012 | Wager | H04L 1/1812 370/329 |
| 2013/0070627 A1* | 3/2013 | Chen | H04W 74/08 370/252 |
| 2015/0245335 A1* | 8/2015 | Zhou | H04L 47/26 370/329 |
| 2017/0013610 A1* | 1/2017 | Lee | H04L 1/00 |

OTHER PUBLICATIONS

Search Report for the EP patent application 15202452.7 dated Apr. 26, 2016 (6 pages).

* cited by examiner

ALLOCATION OF UPLINK RESOURCES IN ORTHOGONAL FREQUENCY-DIVISION MULTIPLE ACCESS (OFDMA) WIRELESS NETWORKS

CROSS REFERENCE TO RELATED APPLICATIONS

This application claims priority under 35 U.S.C. § 119 from U.S. Provisional Application No. 62/095,886, entitled "Uplink Signaling OFDMA," filed on Dec. 23, 2014, the subject matter of which is incorporated herein by reference.

TECHNICAL FIELD

The disclosed embodiments relate generally to wireless network communications, and, more particularly, to improved allocation of access slots in uplink orthogonal frequency-division multiple access (OFDMA) wireless communications systems.

BACKGROUND

IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. Recently, WLAN has seen exponential growth across organizations in many industries.

Orthogonal frequency division multiple access (OFDMA) technology has developed in the cellular networks enabling multiple users to share the same wideband frequency range at the same time. Such technology, however, has not been developed for WLAN networks. How to adapt the OFDMA technology to WLAN networks so to enable sharing of the same wideband frequency range among multiple users remains a question. For a normal uplink OFDMA operation, an access point (AP) needs to collect the traffic requests from wireless devices (STAs), arranging and managing the resource used by STAs for the uplink OFDMA transmission. However, only using designated resource for uplink OFDMA may not be efficient.

In OFDM/OFDMA wireless systems, contention-based uplink transmission is commonly used for multiple user equipments (UEs) to transmit uplink data to a serving base station via a shared uplink channel. For example, a UE may request access and acquire ownership of an uplink channel to initiate transmission. Therefore, in WLAN, contention-based random access can also be used for uplink OFDMA operation. For contention-based random access, multiple STAs contend for shared resource.

To improve the efficiency of the WLAN network allowing multiple users to share the same wideband WLAN channel, improvement and enhancement are required for the WLAN network.

SUMMARY

A method of performing an improved contention-based uplink OFDMA transmission is proposed in accordance with one novel aspect. A wireless communications station (an AP) reserves both dedicated resource and contention resource for uplink OFDMA operation for a list of communications devices (STAs). For contention-based random access, the AP does not need to collect traffic requests from the STAs. The AP only needs to make simple resource arrangement. The AP only needs to specify the allocated resource for random access and the uplink OFDMA operation duration and timing for each uplink OFDMA packet. Each STA having traffic request will contend the resource based on a random access probability scheme.

In one embodiment, a wireless communication station can switch between contention-based random access operation and non-random access operation. For example, the wireless communication may operate in contention-based random access mode when the amount of traffic communicated by the station is below a given threshold; however, when the traffic communicated becomes greater than the threshold the wireless communication station can switch to non-random access operation. Non-random access operation allows the wireless communication station to reduce the amount of collisions between uplink OFDMA frames received by the wireless communication station by scheduling the time and frequency of the multiple uplink OFDMA frames.

In another embodiment, a wireless communication station receives multiple uplink OFDMA frames that are sent during randomly selected access slot and on randomly selected sub-channels. The wireless communication station determines if the any of the multiple uplink OFDMA frames collide upon arriving to the wireless communication station. In the event that two uplink OFDMA frames do collide with each other, the wireless communication station assigns an unique access slot and an unique sub-channel to govern the resending of each of the colliding uplink OFDMA frames.

In yet another embodiment, a wireless communication station receives multiple uplink OFDMA frames that are sent during randomly selected access slot and on randomly selected sub-channels. The wireless communication station determines if the any of the multiple uplink OFDMA frames collide upon arriving at the wireless communication station. In the event that two uplink OFDMA frames do collide, the wireless communication station determines a probability to be used in determining when each of the colliding uplink OFDMA frames are to be resent, thereby controlling the frequency at which colliding uplink OFDMA frames are resent to the wireless communication station, thereby reducing the probability of future collisions.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
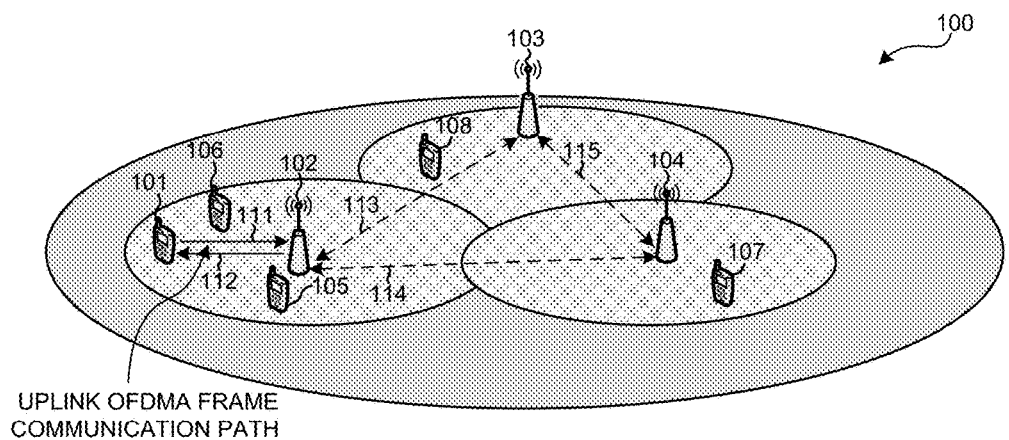
FIG. 1 illustrates an exemplary wireless network supporting improved uplink OFDMA frame communication in accordance with embodiments of the current invention.

FIG. 1 illustrates an exemplary wireless communications network 100 using OFDMA in accordance with embodiments of the current invention. Wireless communications network 100 includes one or more wireless communications networks, each wireless communications network has a fixed base infrastructure unit, such as wireless communications stations 102 103, and 104, forming wireless networks distributed over a geographical region. The base unit may also be referred to as an access point, an access terminal, a wireless communication station, a Node-B, an eNode-B, or by other terminology used in the art. Each of the wireless communications stations 102, 103, and 104 serves a geographic area. Backhaul connections 113, 114 and 115 interconnect the non-co-located wireless communications stations, such as 102, 103, and 104 with each other. These backhaul connections can be either ideal or non-ideal.

A wireless communications device (STA) 101 in wireless network 100 is served by wireless communication station 102 via uplink 111 and downlink 112. Other wireless communications devices (STAs) 105, 106, 107, and 108 are served by different wireless communications stations. STAs 105 and 106 are served by wireless communications station 102. STA 107 is served by wireless communications station 104. STA 108 is served by wireless communications station 103.

In one embodiment, wireless communications network 100 is an OFDMA system comprising wireless communications stations/access points (APs) 102, 103 and 104, and a plurality of wireless communications devices, such as wireless stations (STAs) 101, 105, 106, 107 and 108. In the applications, each wireless communications station serves multiple wireless communications devices that transmit packets using uplink OFDMA. In some scenarios, multiple wireless devices contending for the wireless channel access at the same time and resulting in collisions. For a normal uplink OFDMA operation, an AP needs to collect the traffic requests from STAs, and arranging and managing dedicated the resource used for uplink OFDMA transmission. However, only using dedicated resource for uplink OFDMA transmission may not be efficient.

In one novel aspect, a hybrid uplink OFDMA transmission scheme is proposed. AP reserves both dedicated resource and contention resource for uplink OFDMA operation. For contention-based random access, AP does not need to collect traffic requests and only needs to make simple resource arrangement. For example, AP 102 does not need to collect the traffic requests from STA 101, STA 105, and STA 106. AP 102 only needs to specify the allocated resource for random access and the uplink OFDMA operation duration and timing for each uplink OFDMA packet. Each STA having traffic request will contend the resource based on a random access probability scheme. Alternatively, dedicated resource (non-random access) can reduce the amount of collision between various uplink OFDMA frames by assigning an access slot and sub-channel to each uplink OFDMA frame. The proposed hybrid uplink OFDMA transmission scheme allows a wireless communication station to operate at optimum performance depending on varying demands.

Figure 2:
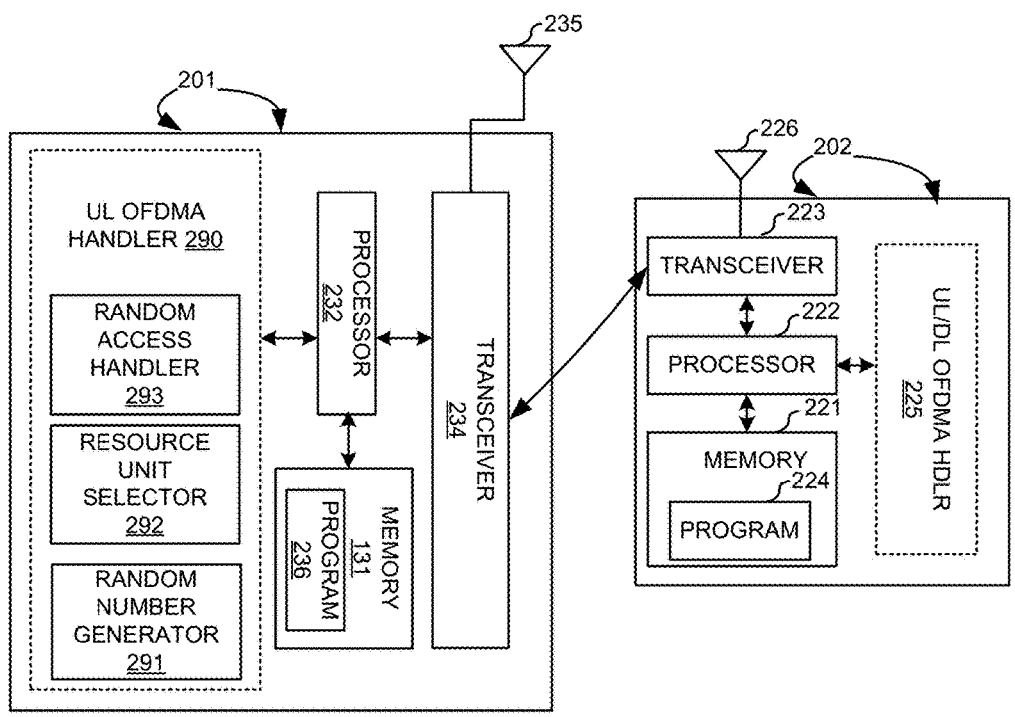
FIG. 2 illustrates an exemplary block diagram in a wireless system configured with a hybrid uplink OFDMA transmission scheme communication in accordance with embodiments of the current invention.

FIG. 2 illustrates an exemplary block diagram in a wireless system configured with a hybrid uplink OFDMA transmission scheme in accordance with embodiments of the current invention. Wireless communications station AP 202 has an antenna 226, which transmits and receives radio signals. A RF transceiver module 223, coupled with the antenna, receives RF signals from antenna 226, converts them to baseband signals and sends them to processor 222. RF transceiver 223 also converts received baseband signals from processor 222, converts them to RF signals, and sends out to antenna 226. Processor 222 processes the received baseband signals and invokes different functional modules to perform features in wireless communications station AP 202. Memory 221 stores program instructions and data 224 to control the operations of wireless communications station AP 202. Wireless communications station 202 also includes a set of control modules, such as uplink (UL)/downlink (DL) OFDMA handler 225 that handles tasks related to OFDMA handling in wireless communications station 202.

Similarly, wireless communications device STA 201 has an antenna 235, which transmits and receives radio signals. A RF transceiver module 234, coupled with the antenna, receives RF signals from antenna 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in wireless communications device STA 201. Memory 231 stores program instructions and data 236 to control the operations of wireless communications device STA 201.

Wireless communications device STA 101 also includes a set of control circuits that carry out functional tasks. An OFDMA handler comprises both DL OFDMA handler and UL OFDMA handler. The DL OFDMA handler receives OFDMA data frames from a wireless communications station using a downlink wideband channel comprising a number of narrow sub-bands in a WLAN network. The UL OFDMA handler 290 transmits OFDMA data frames to a wireless communications station using a narrow sub-band channel selected from an uplink wideband channel. The UL OFDMA handler 290 further comprises a random number generator 191 that generates a random number for implementing access probability (frequency of resending uplink OFDMA frames) based on a received threshold value from wireless communication station 202, a resource unit selector 292 for selecting a resource unit/sub-band for uplink OFDMA packet transmission, and a random access handler 293 for determining and updating random access probability for each uplink OFDMA opportunity.

Figure 3:
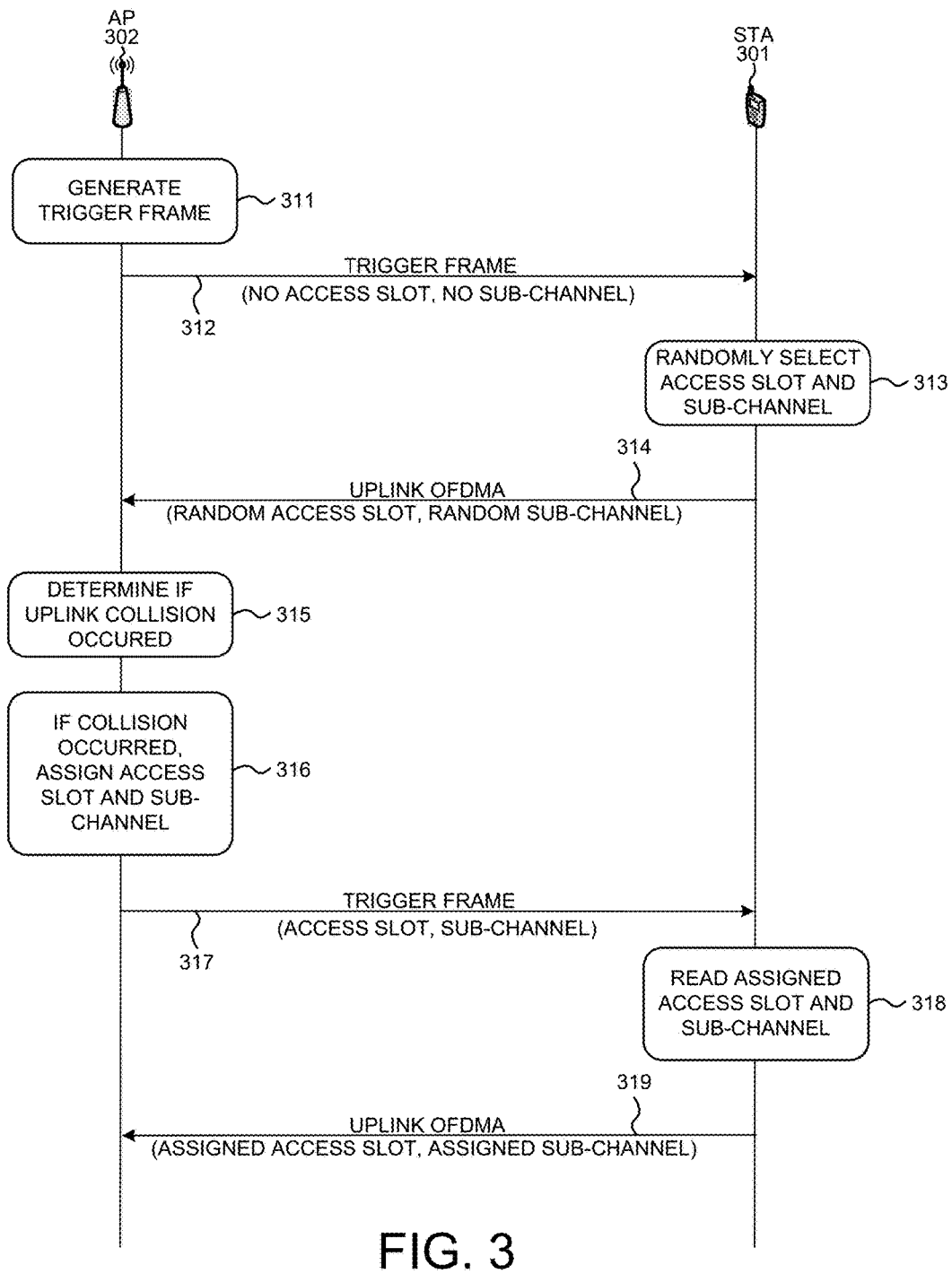
FIG. 3 illustrates an exemplary message flow of uplink OFDMA frame transmission using a hybrid uplink OFDMA transmission scheme.

FIG. 3 illustrates a message flow of uplink OFDMA frame transmission using a hybrid uplink OFDMA transmission scheme between AP 302 and STA 301. In step 311, AP 302 generates a trigger frame. In step 312, AP 302 transmits a trigger frame to a plurality of STAs served by the AP. The trigger frame comprises information for uplink OFDMA transmission. For example, the trigger frame comprises a list of resource units (or sub-bands) allocated for random access, duration and timing for each OFDMA packet. In one example, a resource unit occupies a 20M sub channel, and up to nine (9) resource units may be allocated for random access. In step 313, STA 301 randomly selects an access slot and sub-channel to be used by the STA 301 to communicate an uplink OFDMA frame. In step 314, STA 301 transmits an OFDMA packet to AP 302 using the selected access slot and sub-channel. The OFDMA packet can be a data frame, a control frame, or a management frame. AP 302 transmits an acknowledgement (ACK) frame to the plurality of STAs (not shown). The ACK frame indicates the status of each OFDMA packet. In step 315, AP 302 determines if the uplink OFDMA frame received from STA 301 collided with another uplink OFDMA frame received from another STA. If the uplink OFDMA frame from STA 301 was received without any collisions, then AP 302 continues operation in random access mode. However, FIG. 3 illustrates a scenario where the uplink OFDMA frame did collide with another uplink OFDMA frame and the AP 302 switches to non-random operation in step 316. In step 316, AP 302 assigns an access slot and a sub-channel that governs the resending of the uplink OFDMA frame. In step 317, AP 302 transmits another trigger frame to the plurality of STAs served by the AP. The trigger frame comprises information for uplink OFDMA transmission (access slot and sub-channel). In step 318, STA 301 reads the access slot and sub-channel information from the trigger frame. In step 319, STA 301 transmits an OFDMA packet to AP 302 using the selected access slot and sub-channel. The OFDMA packet can be a data frame, a control frame, or a management frame. AP 302 transmits an acknowledgement (ACK) frame to the plurality of STAs. Steps 311 through 319 complete one UL OFDMA operation. The hybrid uplink OFDMA operation starts again from step 311.

Figure 4:
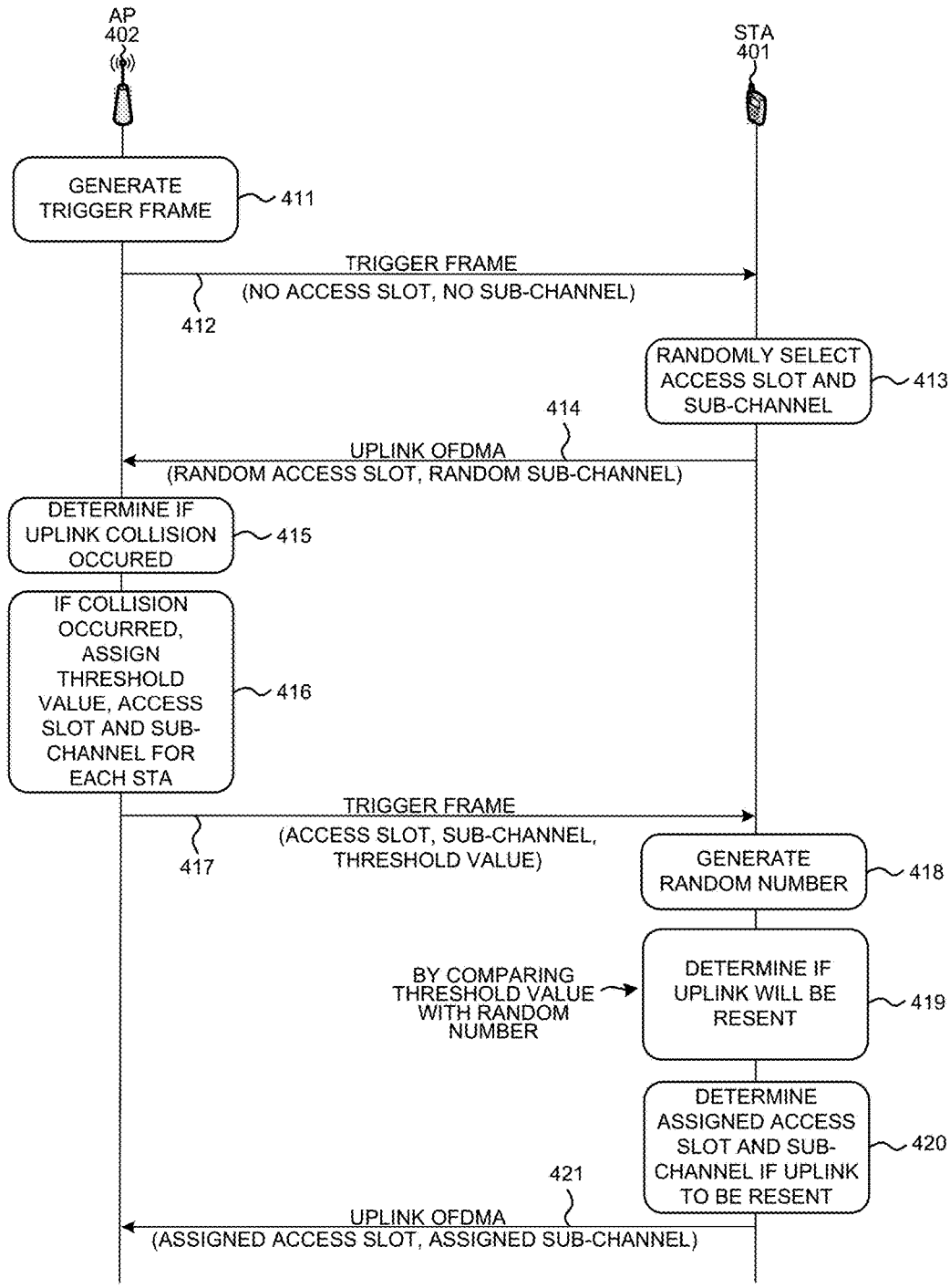
FIG. 4 illustrates a first exemplary message flow of uplink OFDMA frame transmission using a hybrid uplink OFDMA transmission scheme.

FIG. 4 illustrates one embodiment of uplink OFDMA using a hybrid uplink OFDMA transmission scheme. In step 411, AP 402 generates a trigger frame. In step 412, AP 402 transmits a trigger frame to a plurality of STAs served by the AP. The trigger frame comprises information for uplink OFDMA transmission. For example, the trigger frame comprises a list of resource units (or sub-bands) allocated for random access, duration and timing for each OFDMA packet. In one example, a resource unit occupies a 20M sub channel, and up to nine (9) resource units may be allocated for random access. In step 413, STA 401 randomly selects an access slot and sub-channel to be used by the STA 401 to communicate an uplink OFDMA frame. In step 414, STA 401 transmits an OFDMA packet to AP 402 using the selected access slot and sub-channel. The OFDMA packet can be a data frame, a control frame, or a management frame. AP 402 transmits an acknowledgement (ACK) frame to the plurality of STAs (not shown). The ACK frame indicates the status of each OFDMA packet. In step 415, AP 402 determines if the uplink OFDMA frame received from STA 401 collided with another uplink OFDMA frame received from another STA. If the uplink OFDMA frame from STA 401 was received without any collisions, then AP 402 continues operation in random access mode. However, FIG. 4 illustrates a scenario where the uplink OFDMA frame did collide with another uplink OFDMA frame and the AP 402 switches to non-random operation in step 416. In step 416, AP 402 assigns an access slot and a sub-channel that governs the resending of the uplink OFDMA frame.

In step 416, AP 402 also assigns a threshold value that controls the probability that STA 401 will resend an uplink OFDMA frame during a give access slot. In one example, the threshold value varies between one and N, where N is the maximum random number that can be generated on STA 401. The threshold value can be generated in a variety of way.

In a first example, the threshold value is a function of the current number of collision uplink OFDMA frames observed by the AP. In such an example, the threshold value may be increased as the number of uplink OFDMA frame collisions increase, thereby reducing the number of uplink OFDMA frames resent during the next access slot which reduces the number of uplink OFDMA frame collisions during the next access slot. Conversely, the threshold value may be decreased as the number of uplink OFDMA frame collisions decrease, thereby increasing the number of uplink OFDMA frames that will be transmitted during the next access slot.

In a second example, the threshold value is a function of one or more parameters including: traffic load of the wireless communications system, application types, and history of random access of the plurality of wireless communications devices. In this example, one or more parameters can be used as an input to a function that generates the threshold value in such as way that the resulting amount of uplink OFDMA frame collisions during the next access slot is adjusted to a desired number.

In step 417, AP 402 transmits another trigger frame to the plurality of STAs served by the AP. The trigger frame comprises information for uplink OFDMA transmission (access slot and sub-channel) and the threshold value. In step 418, STA 401 generates a random number between one and N. In step 419, STA 401 compares the random number with the threshold value received from AP 402. In the event that the random number is greater than the threshold value, then the STA 401 is to resend the uplink OFDMA frame. Conversely, in the event that the random number is not greater than the threshold value, then the STA 401 is not to resend the uplink OFDMA frame. Therefore, the greater the threshold value selected by the AP 402 the lower the probability of access being granted to STA 401 in response to the trigger frame. In this fashion, the AP 402 can dynamically configure the probability of access by any STA. FIG. 4 illustrates an example where the random number is greater than the threshold value. In step 419, STA 401 determines that the random number is greater than the threshold value. In step 420, STA 401 reads the access slot and sub-channel from the trigger frame. In step 421, STA 401 transmits an OFDMA packet to AP 402 using the selected access slot and sub-channel. The OFDMA packet can be a data frame, a control frame, or a management frame. AP 402 transmits an acknowledgement (ACK) frame to the plurality of STAs. Steps 411 through 421 complete one UL OFDMA operation. The hybrid uplink OFDMA operation starts again from step 411.

Figure 5:
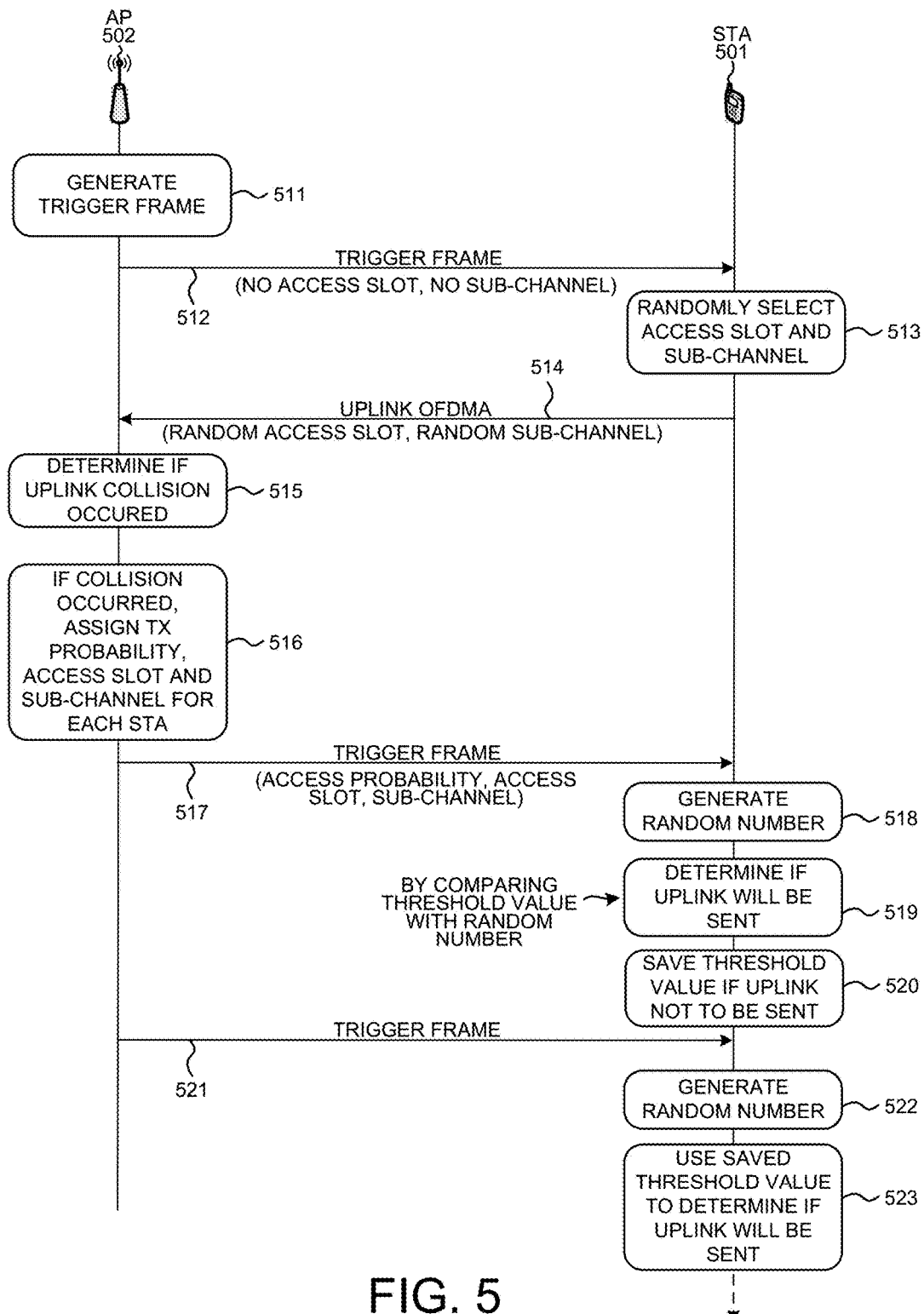
FIG. 5 illustrates a second exemplary message flow of uplink OFDMA frame transmission using a hybrid uplink OFDMA transmission scheme.

FIG. 5 illustrates one embodiment of uplink OFDMA using a hybrid uplink OFDMA transmission scheme. In step 511, AP 502 generates a trigger frame. In step 512, AP 502 transmits a trigger frame to a plurality of STAs served by the AP. The trigger frame comprises information for uplink OFDMA transmission. For example, the trigger frame comprises a list of resource units (or sub-bands) allocated for random access, duration and timing for each OFDMA packet. In one example, a resource unit occupies a 20M sub channel, and up to nine (9) resource units may be allocated for random access. In step 513, STA 501 randomly selects an access slot and sub-channel to be used by the STA 401 to communicate an uplink OFDMA frame. In step 514, STA 501 transmits an OFDMA packet to AP 502 using the selected access slot and sub-channel. The OFDMA packet can be a data frame, a control frame, or a management frame. AP 502 transmits an acknowledgement (ACK) frame to the plurality of STAs (not shown). The ACK frame indicates the status of each OFDMA packet. In step 515, AP 502 determines if the uplink OFDMA frame received from STA 501 collided with another uplink OFDMA frame received from another STA. If the uplink OFDMA frame from STA 5501 was received without any collision, then AP 502 continues operation in random access mode. FIG. 5 illustrates a scenario where the uplink OFDMA frame did collide with another uplink OFDMA frame and the AP 502 switches to non-random operation in step 516. In step 516, AP 502 assigns an access slot and a sub-channel that governs the resending of the uplink OFDMA frame. In step 516, AP 402 also assigns a threshold value that controls the probability that STA 502 will resend an uplink OFDMA frame during a give access slot. In one example, the threshold value varies between one and N, where n is the maximum random number that can be generated on STA 501.

In step 517, AP 502 transmits another trigger frame to the plurality of STAs served by the AP. The trigger frame comprises information for uplink OFDMA transmission (access slot and sub-channel) and the threshold value. In step 518, STA 501 generates a random number between one and N. In step 519, STA 501 compares the random number with the threshold value received from AP 502. In the event that the random number is greater than the threshold value, then the STA 501 is to resend the uplink OFDMA frame. Conversely, in the event that the random number is not greater than the threshold value, then the STA 501 is not to resend the uplink OFDMA frame. Therefore, the greater the threshold value selected by the AP 502 the lower the probability of access being granted to STA 501 in response to the trigger frame. In this fashion, the AP 502 can dynamically configure the probability of access by any STA. FIG. 5 illustrates an example where the random number is less than the threshold value. In step 519, STA 501 compares the random number with the threshold value and determines that the random number is not greater than the threshold value. Therefore, the uplink OFDMA frame is not to be sent by STA 501. In step 520, the threshold value is saved by STA 501 to be used in response to the next trigger frame, unless the next trigger frame includes a new threshold value. In step 521, AP 502 sends another trigger frame that does not include a threshold value. In step 522, STA 501 generates a new random number. In step 534, STA 501 compares the new random number with the saved threshold value. If the new random number is greater than the saved threshold value then STA 501 will send the uplink OFDMA frame and the hybrid uplink OFDMA operation starts again from step 411. Otherwise, the process continues until STA 501 generates a random number that is greater than the threshold value.

Figure 6:
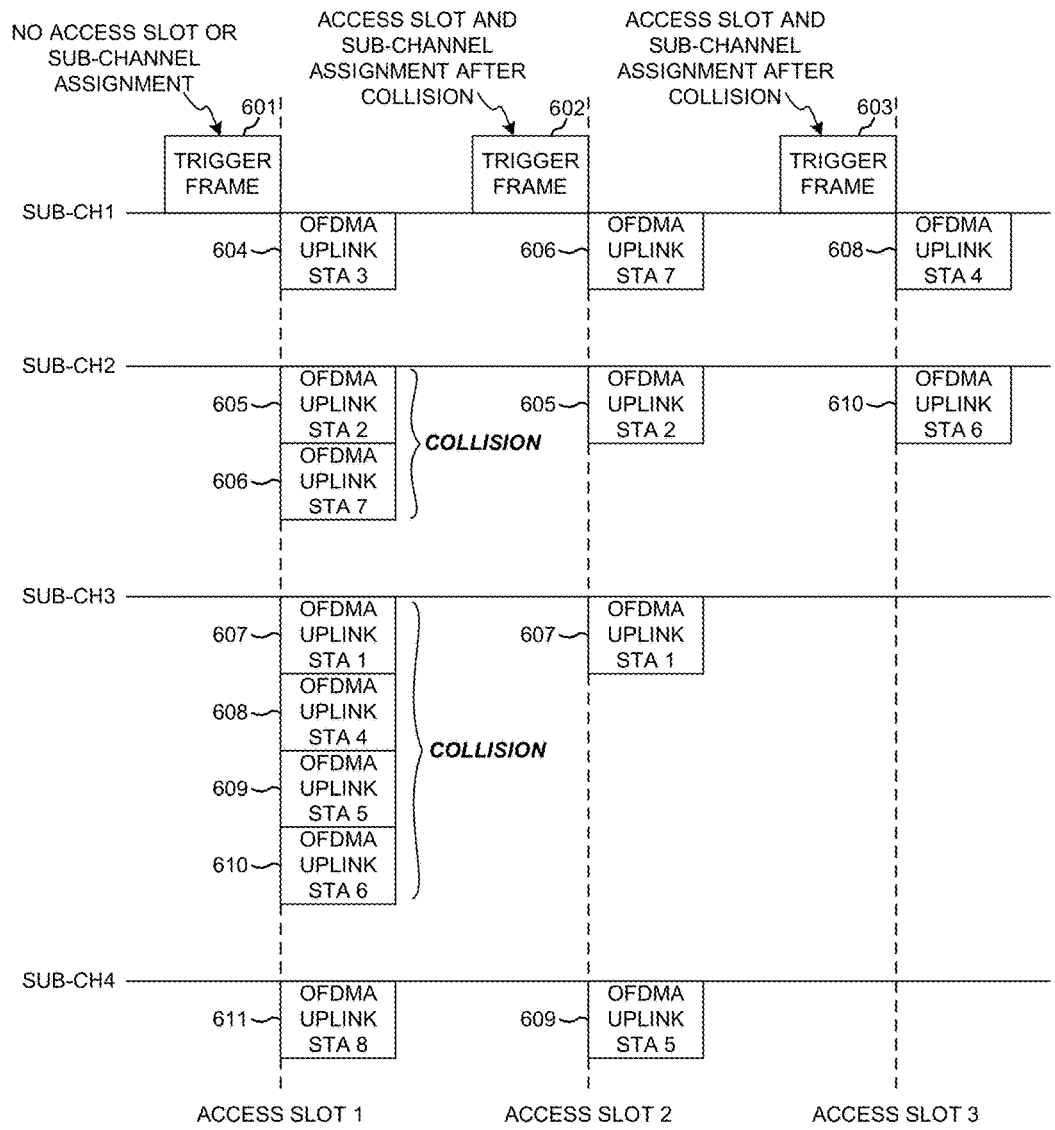
FIG. 6 illustrates one embodiment of switching from random operation to non-random operation of uplink OFDMA frames in a wireless system where the non-random operation utilizes an assigned access slot and sub-channel.

FIG. 6 is a diagram that illustrates the switching from random operation to non-random operation of uplink OFDMA frames in a wireless system where the non-random operation utilizes an assigned access slot and sub-channel. Sub-channels SUB-CH1, SUB-CH2, SUB-CH3, and SUB-CH4 are used to communicate uplink OFDMA frames from an STA to an AP. Trigger frame 601 is sent from an AP to multiple STAs and sets the beginning of access slot one. At this point, the AP is operating in random access mode therefore Trigger frame 601 does not include an assigned access slot or sub-channel for any STAs. The trigger frame 601 is received by all STAs, which in response causes uplink OFDMA frames 1-8 (604-611) to be received by the AP.

Uplink OFDMA frame three 604 is the only frame received by the AP on sub-channel one during the first access slot. Therefore, uplink OFDMA frame three 604 is successfully received without any collision.

Uplink OFDMA frames two 605 and seven 606 are both received by the AP on sub-channel two during the first access slot. Therefore, uplink OFDMA frame two 605 and seven 606 collide and are not successfully received by the AP.

Uplink OFDMA frames one 607, four 608, five 609, and six 610 are received by the AP on sub-channel three during the first access slot. Therefore, uplink OFDMA frame one 607, four 608, five 609, and six 610 collide and are not successfully received by the AP.

Uplink OFDMA frame eight 611 is the only frame received by the AP on sub-channel four during the first access slot. Therefore, uplink OFDMA frame eight 611 is successfully received without any collision.

The unsuccessfully received uplink OFDMA frames need to be resent to the AP. In normal random access operation, each STA would randomly try to resend the uplink OFDMA frame until it was successfully received by the AP. While this method avoids any record keeping by the AP, it also causes reduced efficiency due to increased collisions. A hybrid uplink OFDMA transmission scheme allows the AP to maximize the benefits of both random access operation and non-random access operation.

In response to detecting collisions in sub-channel two and sub-channel three, the AP transmits a second trigger frame 602. Trigger frame 602 includes an assigned access slot and assigned sub-channel for each of the collided uplink OFDMA frames. The trigger frame 602 causes uplink OFDMA frame seven 606 to be sent on sub-channel one, uplink OFDMA frame two 606 to be sent on sub-channel two, uplink OFDMA frame one 607 to be sent on sub-channel three, and uplink OFDMA frame five 609 to be sent on sub-channel four. The trigger frame 602 also causes uplink OFDMA frame four 608 and uplink OFDMA frame six 610 not to be sent on any channel during access slot two. In this method, uplink OFDMA frames one 607, two 605, five 609 and seven 606 are guaranteed not to collide with each other at the expense of delaying the transmission of uplink OFDMA frames four 608 and six 610.

In response to successfully receiving uplink OFDMA frame seven 606, uplink OFDMA frame two 605, uplink OFDMA frame one 607, and uplink OFDMA frame five 609, the AP transmits a third trigger frame 603. Trigger frame 603 includes an assigned access slot and assigned sub-channel for each of the remaining collided uplink OFDMA frames from access slot one. The trigger frame 603 causes uplink OFDMA frame four 608 to be sent on sub-channel one, uplink OFDMA frame six 610 to be sent on sub-channel two. Albeit delayed by one access slot, uplink OFDMA frames four 608 and seven 610 are guaranteed not to collided with each other during access slot three and are successfully received.

Once the all colliding uplink OFDMA frames are received by the AP, the AP can omit any access slot or sub-channel information from subsequent trigger frames, thereby reverting to random access operation. In this fashion, the present invention utilizes a hybrid uplink OFDMA transmission scheme to maximize the benefits of both random access operation and non-random access operation.

Figure 7:
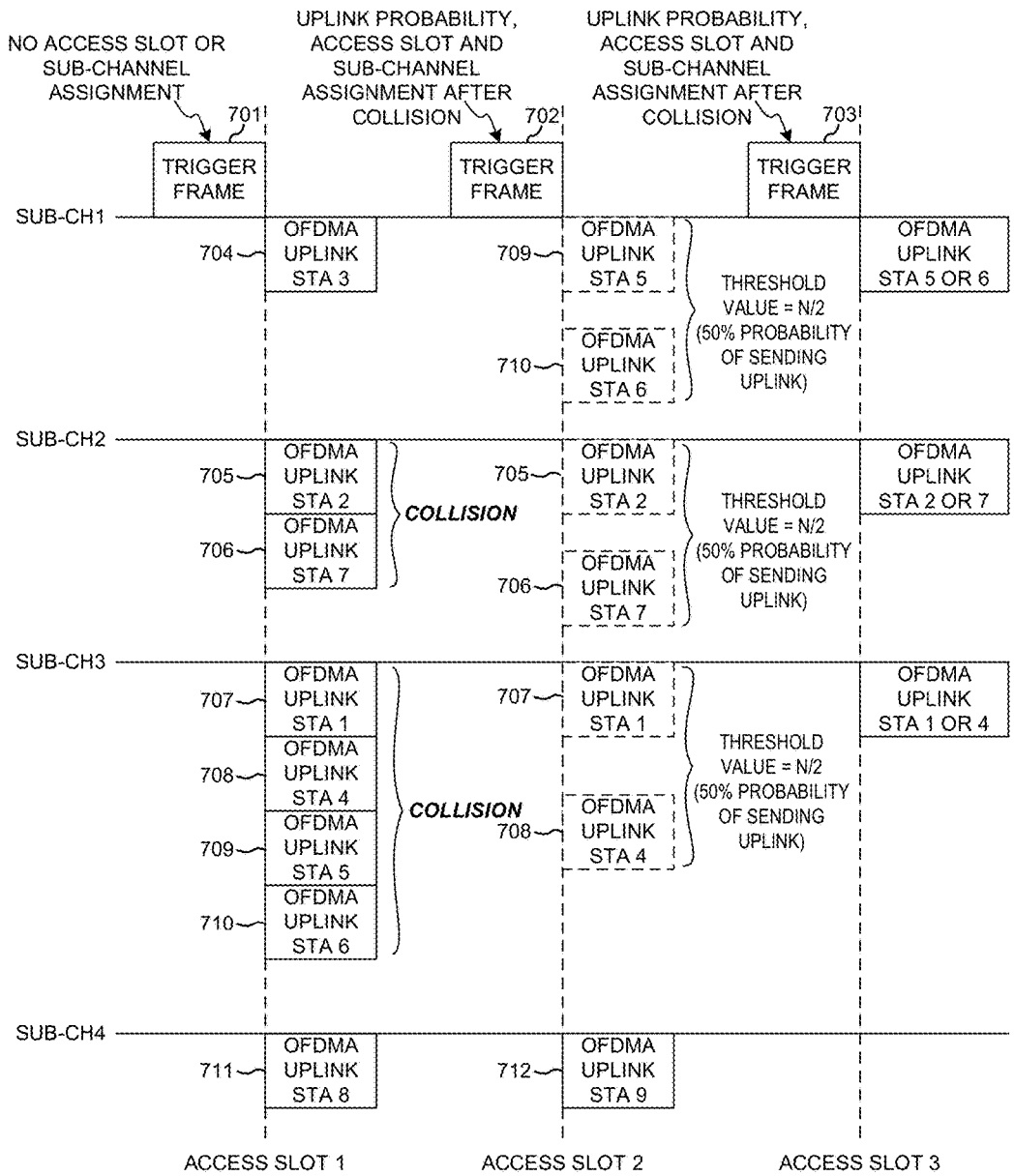
FIG. 7 illustrates another embodiment of switching from random operation to non-random operation of uplink OFDMA frames in a wireless system where the non-random operation utilizes an assigned access slot, sub-channel, and threshold value that controls the frequency at which an uplink OFDMA frame is resent.

FIG. 7 is a diagram that illustrates the switching from random operation to non-random operation of uplink OFDMA frames in a wireless system where the non-random operation utilizes an assigned access slot, sub-channel, and a threshold value that controls the frequency at which an uplink OFDMA frame is resent. Sub-channels SUB-CH1, SUB-CH2, SUB-CH3, and SUB-CH4 are used to communicate uplink OFDMA frames from an STA to an AP. Trigger frame 701 is sent from an AP to multiple STAs and sets the beginning of access slot one. At this point, the AP is operating in random access mode therefore Trigger frame 701 does not include an assigned access slot or sub-channel for any STAs. The trigger frame 701 is received by all STAs, which in response causes uplink OFDMA frames 1-8 (704-711) to be received by the AP.

Uplink OFDMA frame three 704 is the only frame received by the AP on sub-channel one during the first access slot. Therefore, uplink OFDMA frame three 704 is successfully received without any collision.

Uplink OFDMA frames two 705 and seven 706 are both received by the AP on sub-channel two during the first access slot. Therefore, uplink OFDMA frame two 705 and seven 706 collide and are not successfully received by the AP.

Uplink OFDMA frames one 707, four 708, five 709, and six 710 are received by the AP on sub-channel three during the first access slot. Therefore, uplink OFDMA frame one 707, four 708, five 709, and six 710 collide and are not successfully received by the AP.

Uplink OFDMA frame eight 711 is the only frame received by the AP on sub-channel four during the first access slot. Therefore, uplink OFDMA frame eight 711 is successfully received without any collision.

The unsuccessfully received uplink OFDMA frames need to be resent to the AP. In normal random access operation, each STA would randomly try to resend the uplink OFDMA frame until it was successfully received by the AP. While this method avoids any record keeping by the AP, it also causes reduced efficiency due to increased collisions. A hybrid uplink OFDMA transmission scheme allows the AP to maximize the benefits of both random access operation and non-random access operation.

In response to detecting collisions in sub-channel two and sub-channel three, the AP transmits a second trigger frame 702. Trigger frame 702 includes an assigned access slot, assigned sub-channel, and a threshold value that controls the frequency at which an uplink OFDMA frame is resent for each of the collided uplink OFDMA frames.

The trigger frame 702 causes uplink OFDMA frames five 709 and six 710 to possibly be sent on sub-channel one. The threshold value included in trigger frame 702 controls the probability that either uplink OFDMA frame will be transmitted. The threshold value is a number between zero and N, where N is the maximum number that the STA random number generator can generate. As discussed above, the STA compares the random number it generated with a threshold value and only transmits the uplink OFDMA frame if the random value is greater than the threshold value. In the present example, the threshold value is set to N divide by two, thereby setting the probability of transmitting either uplink OFDMA frame to fifty percent. Therefore, on average, only one of the two uplink OFDMA frames will be sent during a given access slot.

The trigger frame 702 causes uplink OFDMA frames two 705 and seven 706 to possibly be sent on sub-channel two. The threshold value included in trigger frame 702 controls the probability that either uplink OFDMA frame will be transmitted. As discussed above, the threshold value is set to N divided by two, thereby setting the probability of transmitting either uplink OFDMA frame to fifty percent.

The trigger frame 702 causes uplink OFDMA frames one 707 and four 708 to possibly be sent on sub-channel three. The threshold value included in trigger frame 702 controls the probability that either uplink OFDMA frame will be transmitted. As discussed above, the threshold value is set to N divided by two, thereby setting the probability of transmitting either uplink OFDMA frame to fifty percent. The trigger frame 702 causes uplink OFDMA frame nine 712 be sent on sub-channel four.

FIG. 7 assumes the average probability takes effect and only one uplink OFDMA frame is transmitted on sub-channels one, two and three during access slot 2, thereby leaving only three remaining uplink OFDMA frames to be transmitted. Trigger frame 703 is transmitted causes one of the remaining uplink OFDMA frames to be successfully communicated on sub-channel one, two and three.

Once the all colliding uplink OFDMA frames are received by the AP, the AP can omit any access slot, sub-channel, or threshold value information from subsequent trigger frames, thereby reverting to random access operation. In this fashion, the present invention utilizes a hybrid uplink OFDMA transmission scheme to further maximize the benefits of both random access operation and non-random access operation.

Figure 8:
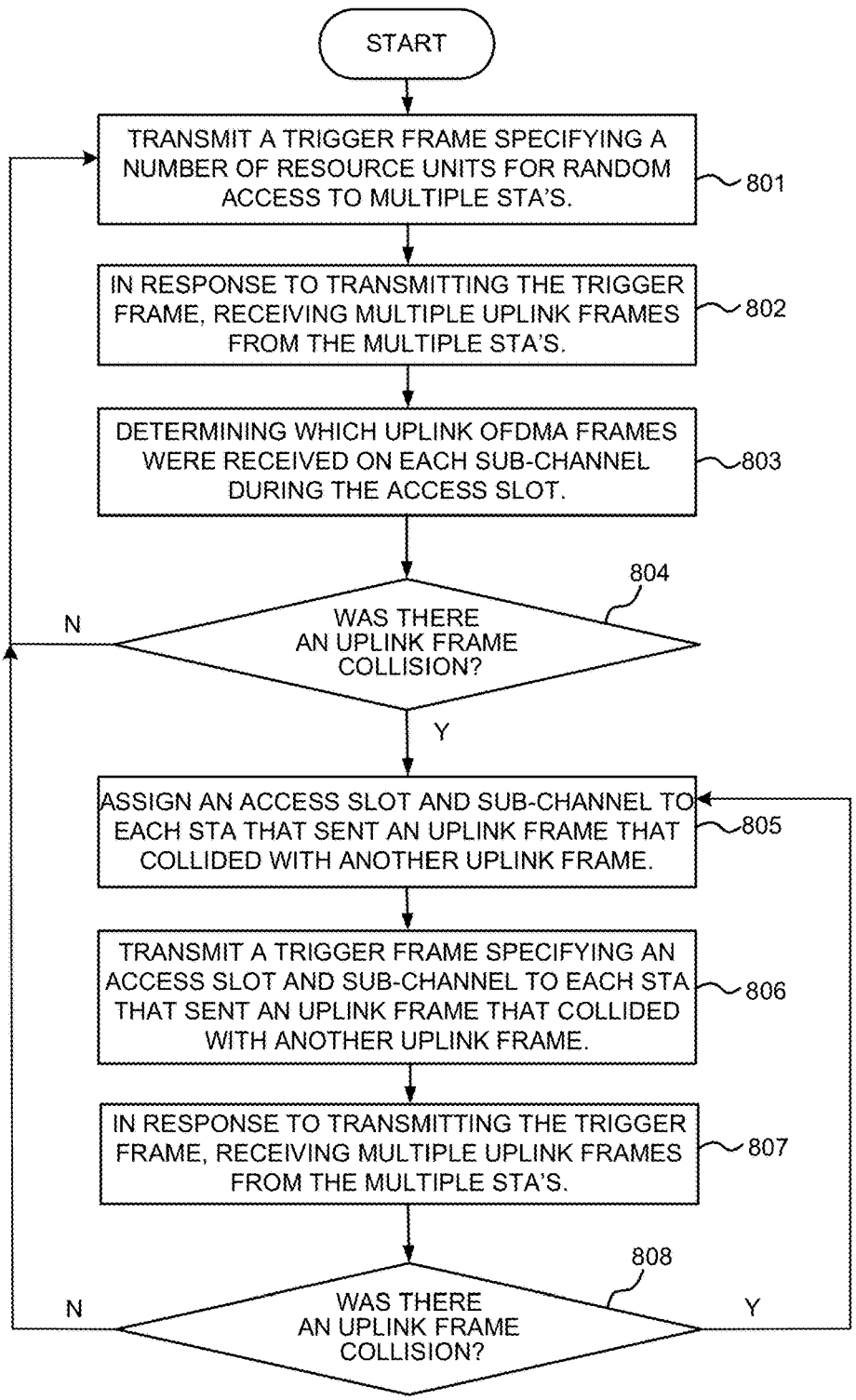
FIG. 8 is a flow chart of a method of a hybrid uplink OFDMA transmission scheme in a wireless system where the non-random operation utilizes an assigned access slot and sub-channel.

FIG. 8 is a flow chart of a method of non-random operation of uplink OFDMA frames in a wireless system where the non-random operation utilizes an assigned access slot and sub-channel. In step 801, a trigger frame is transmitted to multiple STAs. The trigger frame includes a number of resource units. In one example, a resource unit includes an access slot and a sub-channel. In step 802, in response to transmitting the trigger frame, multiple uplink OFDMA frames are received from multiple STAs. In step 803, it is determined which uplink OFDMA frames were received during the access slot. In step 804, it is determined if any collisions occurred between the received uplink OFDMA frames. If it is determined in step 804 that there were no uplink OFDMA frame collisions, then the flowchart returns to step 801 and repeats the same path. If it is determined in step 804 that there were uplink OFDMA frame collisions, then the flowchart continues to step 805. In step 805, an access slot and a sub-channel are assigned for each uplink OFDMA frame that collided during the access slot. In step 806, a second trigger is transmitted. The second trigger includes the assigned access slot and sub-channel. In step 807, in response to the second trigger multiple uplink OFDMA frames are received from multiple STAs. In step 808, it is determined if there were any uplink OFDMA frame collisions. If it is determined in step 808 that there was no collision, then the flowchart returns to step 801 and returns to random access operation. If it is determined in step 808 that there were collisions, then the flowchart returns to step 805 and maintains non-random access operation.

Figure 9:
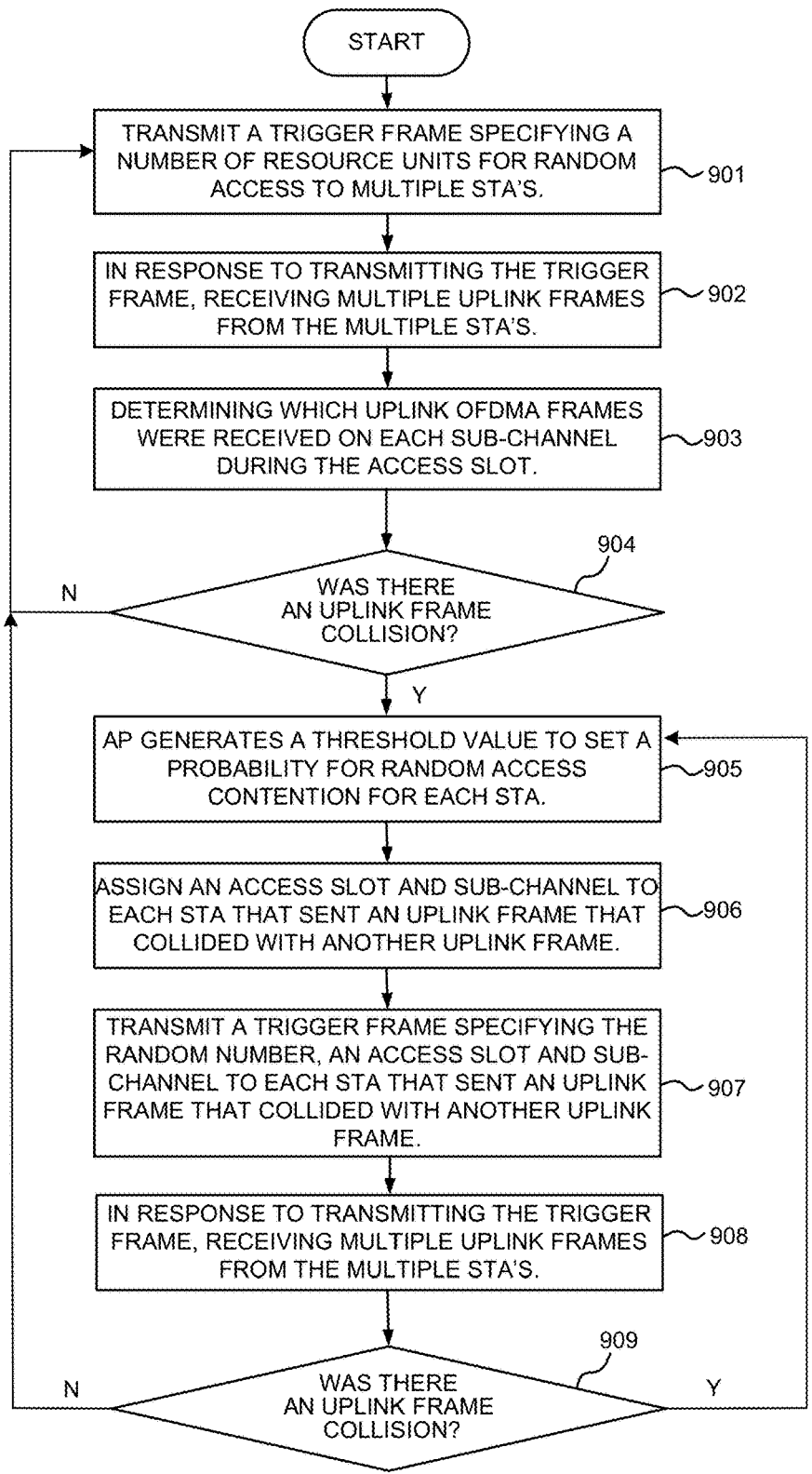
FIG. 9 is a flow chart of a method of a hybrid uplink OFDMA transmission scheme in a wireless system where the non-random operation utilizes an assigned access slot, sub-channel, and threshold value that controls the frequency at which an uplink OFDMA frame is resent.

FIG. 9 is a flow chart of a method of a hybrid uplink OFDMA transmission scheme in a wireless system where the non-random operation utilizes an assigned access slot, sub-channel, and threshold value that controls the frequency at which an uplink OFDMA frame is resent. In step 901, a trigger frame is transmitted to multiple STAs. The trigger frame includes a number of resource units. In one example, a resource unit includes an access slot and a sub-channel. In step 902, in response to transmitting the trigger frame, multiple uplink OFDMA frames are received from multiple STAs. In step 903, it is determined which uplink OFDMA frames were received during the access slot. In step 904, it is determined if any collisions occurred between the received uplink OFDMA frames. If it is determined in step 904 that there were no uplink OFDMA frame collisions, then the flowchart returns to step 901 and repeats the same path in random access operation. If it is determined in step 904 that there were uplink OFDMA frame collisions, then the flowchart continues to step 905. In step 905, a threshold value is assigned for each uplink OFDMA frame that collided during the access slot. In step 905, an access slot and a sub-channel are assigned for each uplink OFDMA frame that collided during the access slot.

In step 907, a second trigger is transmitted. The second trigger includes the assigned access slot, sub-channel, and threshold value. In step 908, in response to the second trigger multiple uplink OFDMA frames are received from multiple STAs. In step 909, it is determined if there were any uplink OFDMA frame collisions. If it is determined in step 909 that there was no collision, then the flowchart returns to step 901 and returns to random access operation. If it is determined in step 909 that there were collisions, then the flowchart returns to step 905 and maintains non-random access operation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for access in a wideband wireless communications network using uplink orthogonal frequency division multiple access (OFDMA), comprising:
   (a) receiving the threshold value, an access slot and a sub-channel on a first frame, wherein the first frame is either a control frame or a trigger frame;
   (b) generating a first random number that is compared to the threshold value;
   (c) determining whether a device is allowed to contend for access based on the comparison, wherein the device waits for a subsequent trigger frame or a subsequent control frame if contention is not allowed, and wherein a second random number is generated for the subsequent trigger frame or the subsequent control frame; and
   (d) transmitting a second frame via a selected resource unit during the access slot on the sub-channel if contention is allowed, wherein the subsequent trigger frame or the subsequent control frame does not include a threshold value, and wherein the threshold value is compared with the second random number to determine whether access contention is allowed.

2. The method of claim 1, wherein the receiving of (a) is performed by a receiving circuit.

3. The method of claim 1, wherein the generating of (b) is performed by random number circuit.

4. The method of claim 1, wherein the determining of (c) is performed by random access circuit.

5. The method of claim 1, wherein the transmitting of (d) is perfomed by a transmitter circuit.

6. The method of claim 1, wherein the second frame is a data frame, a control frame, or a management frame.

7. The method of claim 1, wherein the random access circuit does not update the first random number if contention is allowed.

8. The method of claim 1, wherein the threshold value is received from either a fixed base infrastructure unit, an access point, an access terminal, a wireless communication station, a Node-B, or an eNode-B.

9. The method of claim 1, wherein the access slot and the sub-channel are received in response to a collision of a previous frame transmitted by the device.

10. The method of claim 1, wherein the device initiates an uplink OFDMA by sending a request to send (RTS) frame to the network and in response receives the first frame from the network.

11. The method of claim 1, further comprising:
    wherein a predetermined rule is used for the device to select the access slot and sub-channel randomly.

12. A wireless device, comprising:
    a random number circuit that generates a first random number that is compared to a received threshold value that is not generated by the wireless device, wherein the result of the comparison determines if the wireless device is to contend for random access in a wideband wireless communications network using uplink orthogonal frequency division multiple access (OFDMA);
    a receiver that receives the received threshold value, an access slot and a sub-channel on a first frame, wherein the first frame is either a control frame or a trigger frame;
    a random access circuit that determines whether the device is allowed to contend for access based on the comparison, wherein the device waits for a subsequent trigger frame or a subsequent control frame if contention is not allowed, and wherein a second random number is generated for the subsequent trigger frame or the subsequent control frame; and
    a transmitter that transmits a second frame via a selected resource unit during the access slot on the sub-channel if contention is allowed, wherein the random access circuit further saves the received threshold value, and wherein the subsequent trigger frame or the subsequent control frame does not include a threshold value and the received threshold value is compared with the second random number to determine whether the device is allowed to contend for access.

13. The device of claim 12, wherein the second frame is a data frame, a control frame, or a management frame.

14. The device of claim 12, wherein the random access circuit does not update the first random number if contention is allowed.

15. The device of claim 12, wherein the received threshold value is received from either a fixed base infrastructure unit, an access point, an access terminal, a wireless communication station, a Node-B, or an eNode-B.

16. The device of claim 12, wherein the access slot and the sub-channel are received in response to a collision of a previous frame transmitted by the device.

17. The device of claim 12, wherein the device initiates an uplink OFDMA by sending a request to send (RTS) frame to the network and in response receives the first frame from the network.

18. The device of claim 12, wherein a predetermined rule is used for the device to select the access slot and sub-channel randomly.

* * * * *